United States Patent [19]

Inamoto et al.

[11] 3,883,603

[45] May 13, 1975

[54] ADAMANTYL-(1)-β-NAPHTHOL

[75] Inventors: Yoshiaki Inamoto; Masaaki Takaku; Hirokazu Nakayama; Morimasa Taniguchi, all of Wakayama, Japan

[73] Assignee: Kao Soap Co., Ltd., Tokyo, Japan

[22] Filed: Dec. 16, 1971

[21] Appl. No.: 208,913

[30] Foreign Application Priority Data
Dec. 23, 1970  Japan.............................. 45-117165

[52] U.S. Cl.............. 260/619 D; 252/522; 252/404; 260/586 R
[51] Int. Cl.............................................. C07c 37/00
[58] Field of Search................................ 260/619 D

[56] References Cited
UNITED STATES PATENTS
3,781,371   12/1973   Talbot......................... 260/619 D X

OTHER PUBLICATIONS

S. H. Ong, Chemical Communications (Journal of the Chemical Society (London), Sec. D, (1970), p. 1180.
H. F. Reinhardt, J. of Organic Chemistry, Vol. 27, p. 3260, (1962).

*Primary Examiner*—Leon Zitver
*Assistant Examiner*—D. B. Springer
*Attorney, Agent, or Firm*—Woodhams, Blanchard & Flynn

[57]  ABSTRACT

Adamantylphenols are prepared by reacting haloadamantanes with phenols in the absence of a catalyst at a temperature in the range of 50° to 250°C. The position (ortho or para) of the adamantyl substitution can be controlled by adjusting the proportions of the reactants.

1 Claim, No Drawings

ADAMANTYL-(1)-β-NAPHTHOL

BACKGROUND OF THE INVENTION

1. Field of the Invention

The present invention relates to the preparation of adamantylphenols. More particularly, the present invention relates to a process for the preparation of novel adamantylphenols by the condensation of haloadamantanes and phenols.

2. Description of the Prior Art

It has been well known that haloadamantanes react with aromatic compounds such as benzene, toluene, bromobenzene and so on in the presence of Friedel-Crafts type catalysts to afford adamantyl-substituted benzene derivatives (for example, Stetter et al, Ber., 98, 3888 (1965); Ann., 717, 60 (1968), and Landa et al, Coll Czechoslov Chem. Commun., 24, 93 (1959)).

However, little is known about the reaction of haloadamantanes and phenols.

SUMMARY OF THE INVENTION

According to the present invention, it has been discovered that haloadamantanes react smoothly with phenols without any solvents or catalysts, with evolution of hydrogen halide gas, to yield adamantylphenols. The present invention has been achieved after studying the reaction conditions and the structure of the starting materials, such as the positions of halogen atoms, the position and number of the alkyl substituents on the adamantyl ring and the structure of phenolic compounds in order for the reaction to proceed smoothly. It is proposed according to the present invention that adamantyl- or alkyl adamantyl-substituted phenols are produced by reacting adamantanes, or alkyl adamantanes which are substituted by a halogen atom at the bridgehead, with various kinds of phenolic compounds.

According to the invention, there are prepared adamantylphenol compounds of the formula

Ad—Ar—OH wherein Ad is adamantyl or alkyladamantyl in which the alkyl group contains from 1 to 30 carbon atoms;

Ar is a divalent aromatic radical coupled to a bridgehead carbon of Ad.

The compounds are derived by replacing the ortho and/or para hydrogens of monohydric phenols (H—Ar—OH) by the adamantyl or alkyladamantyl groups. The phenols may be unsubstituted or they may be substituted by aliphatic hydrocarbons. Thus, Ar can be unsubstituted or aliphatic hydrocarbon substituted phenylene, naphthylene or anthrylene. The alkyl substituents on the adamantyl can be in the 1, 3, 5 and/or 7 positions, but at least one of these bridgehead carbon atom positions is unsubstituted and is coupled to Ar.

Adamantylphenols prepared according to the present invention are all new compounds, and are useful as intermediates for the production of plasticizers, lubricant oil additives, artificial flavors and perfumes, and so forth. For example, some of adamantylcyclohexanones, which can be synthesized from adamantylphenols, have pleasant perfume odors like sandal wood oil, fresh greens or musterone. Moreover the phenols having an adamantyl group at the o-position are particularly useful as antioxidants because they are hindered phenols having a bulky adamantyl group ortho to the hydroxyl group.

Haloadamantanes used as a starting material in the present invention include all haloadamantanes which are prepared by halogenation of those alkyladamantanes which have at least one unsubstituted bridgehead position, such as 1-methyladamantane, 1-ethyladamantane, 1,3-dimethyladamantane, 1,3,5-trimethyladamantane, 1,3-dimethyl-5-ethyladamantane, etc. The halogenation is conducted by the procedure of Gerson et al (J. Med. Chem., 6, 760 (1963) ), using t-butyl halide or of Stetter et al (Ber. 93, 226 (1960); Angew. Chem. 71, 429 (1959); Ber. 92, 1629 (1959) ) using bromine.

Phenols used in the present invention are phenolic compounds such as phenol, o-, m- and p-cresols, xylenol and various isomers thereof, naphthol (α or β), anthranol and various isomers thereof.

In order to perform the procedure of the present invention phenols are simply mixed with haloadamantanes and the resulting mixtures are heated. It is not necessary to use any solvents or catalysts. However when phenols with high melting points are employed for the reaction, the use of inert solvents, such as hydrocarbons, makes the reaction proceed much faster. The reaction temperature is 50° to 250°C., preferably 70° to 200°C., and the reaction is completed in from a few minutes to 5 hours in this temperature range.

It is relatively easy to separate the resultant adamantylphenols from the reaction mixture. Any of the usual procedures such as distillation, recrystallization, sublimation and so on can be used. Moreover, it is also possible to utilize the solubility differences of adamantylphenols and unreacted phenols in aqueous alkaline solutions. For example, when a mixture of p-adamantylphenol and phenol was treated with 2 percent sodium hydroxide solution, only the unreacted phenol was extracted into the aqueous layer.

The advantages of the procedure of the present invention include that not only is there effected the adamantylation of the phenolic aromatic ring, but also the position of the substitution can be controlled by the appropriate selection of the reaction conditions.

We have found a surprising fact that when 0.5 mols of phenol is heated with one mol of adamantyl chloride at 100°C. for 2 hours, more than 80 percent of the resulting adamantylphenol consists of the o-substituted compound. However, when 1.2 mols of phenol is used for every mol of adamantyl chloride, together with the reaction time of 5 hours, the proportion of the resulting o- and p-substituted compounds is about 50/50 (wt. percent). On the other hand, when 10 mols of phenol is used per one mol of adamantyl chloride, the p-substituted compound is obtained in the yield of more than 98 percent. The selective substitution at the ortho position by a bulky adamantyl group has never been described in the literature, and in these new findings lies an essential aspect of the novelty of the present invention. This fact is distinctly explained when it is presumed that the alkylation of phenol by the adamantyl cation occurs at first preferentially on the o-position and p-substituted compounds are produced by the subsequent rearrangement of the o-adamantylphenol, which proceeds intermolecularly. This presumption seems to be supported by the present inventors' following experiment.

2-Adamantyl-5-methylphenol was obtained in a high yield by the reaction of o-adamantylphenol with excess m-cresol in the presence of hydrogen chloride. p-

Adamantylphenol was obtained in a high yield by the reaction of 2-adamantyl-4 methylphenol with excess phenol. 2-Adamantyl-5-methylphenol is the only product of the reaction of adamantyl chloride and m-cresol. p-Adamantylphenol remained unchanged on heating with m-cresol.

Illustrative examples of the present invention are set forth below to explain the present invention further.

EXAMPLE 1

A mixture of 10.0 g. of adamantyl-(1)-chloride and 60.0 g. of phenol was stirred at 100°C. for 3 hours, then the mixture was heated at 140°C. for 5 hours. After cooling the reaction mixture to room temperature, it was dissolved in 100 ml. of ether, 100 ml. of 10 percent aqueous solution of sodium hydroxide was added thereto, and the resulting white crystals were filtered. The white crystals were dispersed in water, the dispersion was acidified with hydrochloric acid and was then extracted with ether and the extract was dried over anhydrous sodium sulfate. When the ether was removed, 10.4 g. (yield: 77.6 percent) of p-adamantyl-(1)-phenol was obtained. This was sublimed for purification under reduced pressure to obtain pure p-adamantyl-(1)-phenol of which the melting point is 186.0 – 187.0°C.

Analytical values for this compound were as follows.

Elemental analyses:
Found: C 84.0%, H 8.7%, O 6.9%.
Calc'd for $C_{16}H_{20}O$: C 84.16%, H 8.83%, O 7.01%.
IR Spectra ($cm^{-1}$): 3200, 2920, 1615, 1600, 1515, 1450, 1370, 1250, 835, 805
NMR Spectra ($\tau$): 2.67 (d, J = 9.0Hz, 2H)
3.12 (d, J = 9.0Hz, 2H)
6.04 (s, 1H)
7.7–8.3 (m, 15H)

EXAMPLE 2

A mixture of 10.5 g. of adamantyl-(1)-chloride and 8.3 g. of phenol was heated in a similar manner as in Example 1. After cooling the reaction mixture to room temperature it was dissolved in 100 ml. of ether and then 100 ml. of 10 percent aqueous solution of sodium hydroxide was added thereto. The resulting white crystals were separated, and they were processed as in Example 1 to obtain 5.5 g. (39.2 percent yield) of p-adamantyl-(1)-phenol. The filtrate, after a white precipitate had been separated, was extracted with ether, the resulting ether layer was dried over anhydrous sodium sulfate, then the solvent was removed to give 5.0 g. of o-adamantyl-(1)-phenol (35.6 percent yield). This was sublimed for purification under reduced pressure to give pure o-adamantyl-(1)-phenol of which the melting point is 145.0 – 146.5°C.

Analytical values for this compound were as follows.

Elemental analyses:
Found: C 84.3%, H 8.4%, O 6.6%.
Calc'd for $C_{16}H_{20}O$: C 84.13%, H 8.83%, O 7.01%.
IR Spectra ($cm^{-1}$): 3530, 2900, 1600, 1585, 1500, 1442, 1342, 1245, 1215, 752
NMR Spectra ($\tau$): 2.82 – 3.75 (m, 4H), 5.62 (s, 1H), 7.92 and 8.25 (m, 15H)

EXAMPLE 3

A mixture of 100 g. of adamantyl-(1)-chloride and 2.8 g. of phenol was treated by a method similar to that described in Example 1. The reaction mixture was identified on gaschromatography to establish that o-adamantyl-(1)-phenol and p-adamantyl-(1)-phenol were obtained in the proportion of 80/20 percent by weight.

EXAMPLE 4

A reactor containing 25.5 g. of adamantyl-(1)-chloride and 17.1 g. of phenol was immersed in an oil bath, which was previously heated to 120°C. When the reactor was kept at the same temperature for 5 minutes the contents solidified. This reaction mixture was treated as in Example 1 to obtain 30.0 g. (88.0 percent yield) of p-adamantyl-(1)-phenol.

EXAMPLE 5

A mixture of 10.0 g. of adamantyl-(1)-chloride and 60.0 g. of m-cresol was gradually heated and kept at 100°C. for 2 hours, then it was kept at 140°C. for 6 hours. After cooling the resulting reaction mixture to room temperature, it was dissolved in 100 ml. of ether, the solution was washed with 5 percent aqueous solution of sodium hydroxide, and the resulting ether layer was dried over anhydrous sodium sulfate. The solvent was removed therefrom to give 10.8 g. (76.2 percent yield) of 2-adamantyl-(1)-5-methylphenol.

Analytical values for this compound were as follows.

Melting Point (M.P.): 116.0° – 117.5°C.
Elemental Analyses:
Found: C 84.2%, H 9.2%, O 6.3%.
Calc'd for $C_{17}H_{22}O$: C 84.25%, H 9.15%, O 6.60%.
IR Spectra ($cm^{-1}$): 3550, 2900, 1615, 1448, 1405, 1214, 1114, 846, 798
NMR Spectra ($\tau$): 3.03 (d, J = 7.8Hz, 1H),
3.42 (d, J = 7.8Hz, 1H),
3.77 (s, 1H), 5.56 (s, 1H),
7.77 (s, 3H), 7.90 and 8.21 (m, 15H)

EXAMPLE 6

When 10.0 g. of adamantyl-(1)-chloride was reacted with 60 g. of p-cresol, as in Example 5, 11.9 g. (83.9 percent yield) of 2-adamantyl-(1)-4-methylphenol was obtained. Anayltical values for this compound were as follows:

M.P.: 127.5 – 129.0°C.
Elemental Analyses:
Found: C 83.8%, H 9.3%, O 6.3%.
Calc'd for $C_{17}H_{22}O$: C 84.25%, H 9.15%, O 6.60%.
IR Spectra ($cm^{-1}$): 3540, 2900, 1603, 1500, 1248, 1112, 806
NMR Spectra ($\tau$): 3.00 (s, 1H), 3.16 (d, 7.8Hz, 1H),
3.45 (d, 7.8Hz, 1H), 5.84 (s, 1H),
7.75 (s, 3H), 7.90 and 8.24 (m, 15H)

EXAMPLE 7

10.0 g. of adamantyl-(1)-chloride and 60 g. of o-cresol were processed, as in Example 2, to obtain 8.5 g. (59.7% yield) of 4-adamantyl-(1)-2-methylphenol and 1.9 g. (13.4 percent yield) of 2-adamantyl-(1)-6-methylphenol.

Analytical values of 4-adamantyl-(1)-2-methylphenol were as follows.

|  |  |
|---|---|
| M.P.: | 138.0 – 139.0°C. |
| Elemental Analyses: | |
| Found: | C 84.3%, H 9.0%, O 6.3%. |
| Calc'd for $C_{17}H_{22}O$: | C 84.25%, H 9.15%, O 6.60%. |
| IR Spectra (cm$^{-1}$): | 3400, 2900, 1600, 1500, 1445, 1350, 1218, 1115, 870, 823, 804 |
| NMR Spectra ($\tau$): | 2.90 (s, 1H), 2.96 (d, J = 9.0Hz, 1H), 3.32 (d, J = 9.0Hz, 1H), 5.47 (s, 1H), 7.75 (s, 3H), 7.92, 8.08 and 8.22 (m, 15H) |

And analytical values for 2-adamantyl-(1)-6-methylphenol were as follows.

|  |  |
|---|---|
| M.P.: | 119.5 – 120.5°C. |
| Elemental Analyses: | |
| Found: | C 84.1%, H 9.0%, O 6.3%. |
| Calc'd for $C_{17}H_{22}O$: | C 84.25%, H 9.15%, O 6.60%. |
| IR Spectra (cm$^{-1}$): | 3590, 2890, 1595, 1480, 1425, 1340, 1246, 1180, 1055, 767, 738 |
| NMR Spectra ($\tau$): | 2.8 – 3.4 (m, 3H), 5.30 (s, 1H), 7.81 (s, 3H), 7.87 and 8.22 (m, 15H) |

EXAMPLE 8

10.3 g. of adamantyl-(1)-chloride and 52.0 g. of β-naphthol were processed, as in Example 5, to obtain 7.0 g. (42.0 percent yield) of adamantyl-(1)-β-naphthol. The substituting position was not distinguished. Analytical values for this compound were as follows.

|  |  |
|---|---|
| M.P.: | 194 – 195°C. |
| Elemental Analyses: | |
| Found: | C 85.9%, H 7.7%, O 6.3%. |
| Calc'd for $C_{20}H_{22}O$: | C 86.28%, H 7.97%, O 5.75%. |
| IR Spectra (cm$^{-1}$): | 3400, 1600, 1210, 1180, 1145, 920, 855, 800 |

EXAMPLE 9

A mixture of 5.0 g. of adamantyl-(1)-bromide and 25 g. of phenol was heated with stirring at 140°C. for 8 hours. After cooling the reaction mixture it was treated, as in Example 1, to obtain 4.0 g. (76.0 percent yield) of p-adamantyl-(1)-phenol.

EXAMPLE 10

4.1 g. of a mixture composed of o-adamantyl-(1)-phenol and p-adamantyl 1)-phenol in which the mixing ratio was 1/1 by weight, was mixed with 26 g. of phenol, and the resulting mixture was heated at 140°C. for 5 hours while hydrochloric gas was introduced therein. It was confirmed by the anaylsis of the reaction mixture on gas-chromatography that all the o-adamantyl-(1)-phenol were isomerized into p-adamantyl-(1)-phenol.

EXAMPLE 11

A mixture of 1.0 g. of 2-adamantyl-(1)-5-methylphenol and 6.0 g. of phenol was processed in the same way as in Example 10 to obtain p-adamantyl-(1)-phenol quantitatively.

The embodiments of the invention in which an exclusive property or privilege is claimed are defined as follows:

1. An adamantyl-(1)-β-naphthol having a melting point of 194°–195°C.

* * * * *